United States Patent
Wolf et al.

(10) Patent No.: US 11,953,072 B2
(45) Date of Patent: Apr. 9, 2024

(54) METHOD FOR DAMPING TORSIONAL VIBRATIONS IN A DRIVE TRAIN, AND DRIVE TRAIN

(71) Applicant: AIRBUS HELICOPTERS TECHNIK GMBH, Calden (DE)

(72) Inventors: Daniel Wolf, Friedrichshafen (DE); Jörg Litzba, Fuldatal (DE); Johannes Schäfer, Friedrichshafen (DE); Georg Tenckhoff, Friedrichshafen (DE)

(73) Assignee: AIRBUS HELICOPTERS TECHNIK GMBH, Calden (DE)

( * ) Notice: Subject to any disclaimer, the term of this patent is extended or adjusted under 35 U.S.C. 154(b) by 749 days.

(21) Appl. No.: 17/053,542

(22) PCT Filed: May 3, 2019

(86) PCT No.: PCT/EP2019/061325
§ 371 (c)(1),
(2) Date: Nov. 6, 2020

(87) PCT Pub. No.: WO2019/215018
PCT Pub. Date: Nov. 14, 2019

(65) Prior Publication Data
US 2021/0277975 A1 Sep. 9, 2021

(30) Foreign Application Priority Data
May 8, 2018 (DE) .......................... 102018207140.3

(51) Int. Cl.
*F16F 15/00* (2006.01)
*B64D 31/00* (2006.01)
*F16F 15/10* (2006.01)

(52) U.S. Cl.
CPC ............ *F16F 15/002* (2013.01); *B64D 31/00* (2013.01); *F16F 15/10* (2013.01);
(Continued)

(58) Field of Classification Search
CPC .... F16F 15/002; F16F 15/10; F16F 2228/066; F16F 2232/02; F16F 2236/08; B64D 31/00; F16D 2300/22
(Continued)

(56) References Cited

U.S. PATENT DOCUMENTS 5,678,460 A   10/1997 Walkowc
5,895,012 A   4/1999 Krysinski et al.
(Continued)

FOREIGN PATENT DOCUMENTS

DE    100 05 178 A1    8/2001
DE    10005178 A1      8/2001
(Continued)

OTHER PUBLICATIONS

International Search Report for Application No. PCT/EP2019/061325, Completed Jul. 25, 2019, 4 pages.
(Continued)

*Primary Examiner* — Tyler D Paige
(74) *Attorney, Agent, or Firm* — BROOKS KUSHMAN P.C.

(57) ABSTRACT

A torsional moment acting on a component in a drive train of an aircraft may be determined using at least one sensor, where the determined torsional moment is used for adjusting at least one adjustable damping element located in or on the component and/or for regulating a torsional stiffness in the torque-conducting component. As a result, the torsional load in the component may be reduced.

17 Claims, 6 Drawing Sheets

(52) U.S. Cl.
CPC .... *F16D 2300/22* (2013.01); *F16F 2228/066* (2013.01); *F16F 2232/02* (2013.01); *F16F 2236/08* (2013.01)

(58) Field of Classification Search
USPC .......................................................... 701/99
See application file for complete search history.

(56) References Cited

U.S. PATENT DOCUMENTS

| | | | |
|---|---|---|---|
| 5,934,424 | A | 8/1999 | Hosek et al. |
| 6,290,620 | B1 | 9/2001 | Tsai et al. |
| 8,454,315 | B2 | 6/2013 | Welsh |
| 9,067,492 | B2 | 6/2015 | Hairston et al. |
| 11,649,051 | B2 * | 5/2023 | Arlton .................. B64C 39/024 244/17.23 |
| 2003/0089822 | A1 | 5/2003 | Koch et al. |
| 2007/0279012 | A1 * | 12/2007 | Sihler .................... H02P 23/04 322/20 |
| 2010/0038473 | A1 * | 2/2010 | Schneider ............. F16F 15/134 184/6.12 |
| 2017/0089189 | A1 | 3/2017 | Norris et al. |
| 2018/0278188 | A1 * | 9/2018 | Zhang .................. H02K 7/1823 |
| 2021/0277975 | A1 * | 9/2021 | Wolf ...................... B64D 31/00 |

FOREIGN PATENT DOCUMENTS

| | | |
|---|---|---|
| DE | 10 2007 055 336 A1 | 8/2008 |
| DE | 102007055336 A1 | 8/2008 |
| GB | 729696 | 5/1955 |
| WO | 2008086774 A2 | 7/2008 |
| WO | WO 2008/086774 | 7/2008 |

OTHER PUBLICATIONS

International Search Report and Written Opinion of the International Search Authority dated Aug. 2, 2019 in International Application No. PCT/EP2019/061325 (English and German languages) (14 pp.).

* cited by examiner

METHOD FOR DAMPING TORSIONAL VIBRATIONS IN A DRIVE TRAIN, AND DRIVE TRAIN

RELATED APPLICATIONS

This application is a filing under 35 U.S.C. § 371 of International Patent Application PCT/EP2019/061325, filed May 3, 2019, and claiming priority to German Patent Application 10 2018 207 140.3, filed May 8, 2018. All applications listed in this paragraph are hereby incorporated by reference in their entireties.

TECHNICAL FIELD

The present disclosure relates to a method for damping torsional vibrations in a drive train in aircraft that has a torque-conducting component, and the present disclosure also relates to a drive train and a device for executing the method.

BACKGROUND

The drive train in an aircraft, e.g. a helicopter or airplane, forms a connection between the drive and a propulsion drive or ascending drive (airscrew, propeller, turbine fan) or a servo drive (e.g. landing flaps, tail unit, landing gear), via which energy is transferred through a rotational movement.

Dynamic events such as torsional vibrations, play a substantial role in aircraft drive trains. Torsional vibrations are vibrations in a torque-conducting component. In particular in a shaft/mass system with high moments of inertia and extended shafts, as is the case in particular in drive trains or drive assemblies in aircraft, there may be torsional vibrations when rotating masses are coupled to one another by means of torque-conducting components.

Torsional vibrations are fairly common in drive trains in aircraft, and are frequently disruptive or even dangerous if the machine is running at a torsionally critical rotational rate, and the vibrations are amplified through resonance. A mechanical damping of these torsional vibrations is frequently impossible in extended systems.

It is fundamentally known from the prior art to reduce the torsional vibrations in aircraft drive trains by means of torsional dampers or torsional vibration dampers.

An internal combustion engine for an airplane is described in US2003089822A. This internal combustion engine comprises a crankshaft with first and second ends, a propeller, and a transmission that is located between the first end of the crankshaft and the propeller, and functionally connects the propeller to the crankshaft. A torsion rod is located between the first end of the crankshaft and the transmission, and functionally connects the crankshaft to the transmission. A torsional vibration damper is functionally connected to one of the two ends of the crankshaft.

Torsional vibration dampers in aircraft drive shafts are known from DE 102007055336A1 and US2003089822A.

Torsional dampers for aircraft servo drives are known from GB729696A and US6290620B.

That the determination of the vibrations from the torsional moment is often imprecise, such that yield from the compensation procedure is also limited, is regarded as disadvantageous.

BRIEF DESCRIPTION OF THE DRAWINGS

Certain embodiments shall be explained in detail in reference to the following figures. Therein.

DETAILED DESCRIPTION

Figure 1:
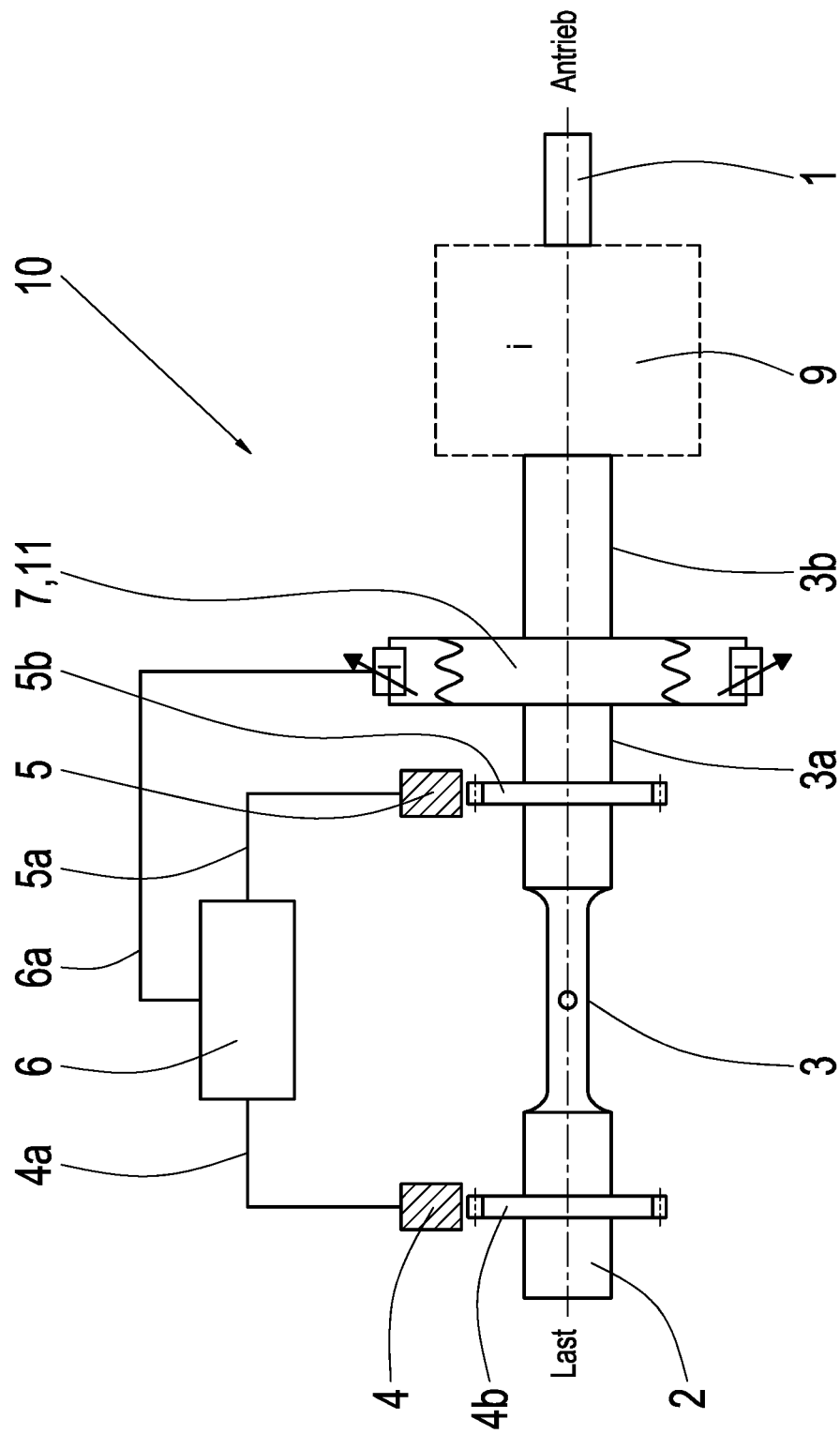
FIG. 1 shows a section of a drive train in an embodiment.

In view of the background above, an object of the present embodiments is to create a method that further reduces the torsional vibrations, and a device for executing this method. It is also the object of the invention to create a drive train with low torsional vibrations.

Certain aspects described herein are based on a method for damping torsional vibrations in aircraft drive trains that have a torque-conducting component.

A torsional moment acting on the component is determined using at least one sensor, and the determined torsional moment is used for regulating at least one adjustable damping element located in or on the torque-conducting component in the drive train, and for regulating a torsional stiffness in the torque-conducting component to reduce the torsional load in the component, and thus in the drive train.

A torque-conducting component is a solid body, in particular, supported such that it can rotate about one of its axes, e.g. a shaft. A torque-conducting component can also take the form of a transmission that converts the rotational rate and torque applied to the drive to values corresponding to the working range of the propulsion or ascending drive, or the servo drive.

First, the torsional moment that is to be damped or regulated is more precisely determined and sent directly to a computer (ECU: electronic control unit), e.g. a control unit, by means of which a greater precision is obtained than with rotational rate-stabilized damping methods.

The control unit regulates the controllable or adjustable damping element, i.e. altering the damping rate or extent of damping, and/or regulating the torsional stiffness of the torque-conducting component, resulting in an increase or decrease in the torsional stiffness, depending on the circumstances. A frequency assessment of the torsion or torque signal is used to adjust the at least one adjustable damping element, e.g. a fast Fourier transform (FFT) over a short time interval, in order to be able to identify the type of stimulation (load or drive), and to dampen at the right location. Other known mathematical processes can likewise be used.

Torsional stiffness describes the resistance of an element to elastic deformation caused by torque.

A damping element in this context is understood to be an element or unit that converts mechanical (vibrational) energy into heat or some other form of energy, thus dissipating vibrations in the vibrational system.

The following mechanisms, known to the person skilled in the art, are to be fundamentally considered for this:
material damping at microscopic levels through internal friction or plasticity of a solid element,
viscous damping through shearing forces at microscopic levels in viscous fluids or gases, and/or frictional damping at microscopic levels through forces at the boundary surfaces between frictional partners moving in relation to one another.

It has proven to be the case that an adaptively or actively adjustable damping system for aircraft drive trains can be obtained by aspects discussed herein.

By reducing the peak load, it is possible to use, in particular, lighter transmissions or torque-conducting components. It has also been shown that the load to these controllable, i.e. adjustable, damping elements can be higher than in the prior art.

This is the case in particular with loads known from aviation, in which air flowing around a propeller is used for starting a motor that has stalled or been shut off (windmilling). This involves high loads and load fluctuations, which led in the past to damages in conventional torsional dampers in drive trains.

A method in which the torsional moment is determined using two sensor elements, specifically a first and second sensor element, is preferred. The first and second sensor elements preferably each detect at least one angular position and/or one rotational rate. These sensors elements are configured, therefore, as angular position sensors or rotational rate sensors. In particular, a difference in angular positions is measured in the torque-conducting component in drive train with these two sensor elements. The deformation in the torque-conducting component between the two sensor elements when a load has been applied thereto can be detected by means of the difference in angular positions. In particular, a phase shift between the first and second sensor elements is detected. The torsion in the torque-conducting component depends substantially on the stiffness of the component and the torque that is applied thereto. The load to the torque-conducting component can be derived from the difference between the angles in the two measured angular positions, wherein a torque load to the component can be determined from this. Furthermore, the rotational rate or number or rotations can likewise be generated from the sensor signals. By way of example, the temporal derivation of the angular position in relation to the selected sensor element corresponds to an angular speed.

Angular position sensors can carry out, for example, an absolute, magnetic encoded angular measurement. Alternatively, magnetic sensor elements can also be used in combination with the gearwheels in a transmission assembly, wherein this represents a cost effective and reliable measurement variation. Other sensor elements for measuring angular positions or angular speeds can likewise be used.

In an alternative embodiment, a method is preferred in which the torsional moment is determined using a single sensor element. In this case, instead of determining an absolute difference, i.e. the difference between two absolute values, as is typical with two sensors, a relative difference is determined.

Magnetoelastic or magnetoresistant sensors can preferably be use for this, i.e. an acoustic sensor or an angular position sensor, which are configured to directly measure a torsion in the component that is to be measured.

With magnetoelastic or magnetoresistant sensors, the component that is to be measured is magnetized. The sensor detects a change in the magnetic field when a change occurs in the mechanical properties, i.e. caused by a shearing load.

The function of a magnetoelastic or magnetoresistant sensor and an angular position sensor can also be obtained with an acoustic sensor, e.g. an airborne sound sensor or a structure-borne sound sensor. This can be placed on the drive train, e.g. in a transmission or on a bearing point, such that the frequencies of two elements located in the drive train are detected. Drive train elements can be elements that generate a frequency correlating to the rotational rate or load, e.g. bearings and gear teeth. The torque or loads (bends) formed in the drive train are calculated from the phase shift in the frequencies or frequency patterns of the two elements and the known stiffness between these elements.

At this point it should be noted that magnetoelastic or magnetoresistant sensors and acoustic sensors are likewise preferred, in particular, for determining the torsional moment by means of two sensor elements.

It is also preferred that the sensor elements are either mounted externally on a drive train component, e.g. the transmission, shaft, bearings, etc., or are integrated therein. Integrated means that the sensor element uses existing components in the drive train for measuring (e.g. a gearwheel as an incremental indicator) or for attachment (housings).

A method is preferred in which the determined torsional moment is used for adjusting two adjustable damping elements to reduce torsional loads in the component. The use of two damping elements has the advantage that targeted dampening can be carried out, in particular with long shafts or in a transmission. This is therefore advantageous if one damping element is placed on the input shaft, and another damping element is placed on the output shaft, of a transmission located in the drive train.

Another aspect is the provision of a drive train, specifically a drive train for aircraft, that has a component configured to conduct a torque, and which has a drive train end and a load end. The drive train comprises at least one sensor element configured to determine a torsional moment acting on the component. The drive train also comprises an adjustable damping element configured to reduce a torsional load in the component, in particular to adjust the degree of damping in the component, and to alter a torsional stiffness of the component. The drive train also comprises a control unit configured to assess the determined torsional moment, and adjust the adjustable damping element based on the torsional moment.

The advantage of the drive train is that it can absorb peak loads using the adaptive damping element, and it can also be lighter.

It is preferred that the damping element is integrated in a clutch unit or a clutch element, which connects two sections of the torque-conducting component.

It is also preferred that two sensor elements are provided for determining the torsional moment.

It is also preferred that two damping elements are provided for reducing the torsional load.

According to another aspect, a device is to be created, in particular a control unit for aircraft, which is configured to execute the method described above.

FIG. 1 shows a drive train 10 in an aircraft in the form of an airplane. The drive train 10 connects a drive with a servo drive for a landing flap. It should be noted that the drive train can also be in a helicopter, by way of example, and can form a mechanical connection there between a drive and an airscrew or a propeller. The drive train 10 comprises a flexible shaft 3, two rotational rate sensors, specifically a first rotational rate sensor 4 and a second rotational rate sensor 5, a computer 6, an adjustable damping element 7, and an optional transmission 9. The rotational rate sensors 4, 5 detect the rotational rate via sensor rings 4b, 5b connected to the shaft for conjoint rotation. The sensor rings are designed as incremental gearwheels in the present example.

An input torque can be introduced into the drive train at the drive end 1 of the drive train 10 by means of a motor, not shown. The shaft 3 is configured to conduct the input torque to a load end 2 of the drive train 10.

The measurement signals from the two sensors 4, 5 are sent to the computer 6 via a suitable transmission path in the form of a radio signal transmission path 4a, or 5a, respectively. A hardwire transmission path could also be used. The computer 6 assesses the received measurement signals and actuates the adjustable damping element 7 via a suitable transmission path 6a. The damping element 7 is integrated in a clutch unit 11, which connects two sections, specifically section 3a and section 3b, of the shaft 3 to one another. The clutch unit 11 comprises two flanges 11a, 11b, wherein each of the two flanges is connected to a respective shaft section 3a, 3b for conjoint rotation, which releasably connect the two sections 3a, 3b of the shaft 3 to one another. The sections 3a and 3b could also be referred to as separate shafts that are connected by means of the clutch element 11.

The two rotational rate sensors 4, 5 are located axially between the load end 2 and the damping element 7 according to the exemplary embodiment in FIG. 1. The torque measurement can fundamentally take place before, behind, or over the clutch element/torsion damping element.

Figure 2:
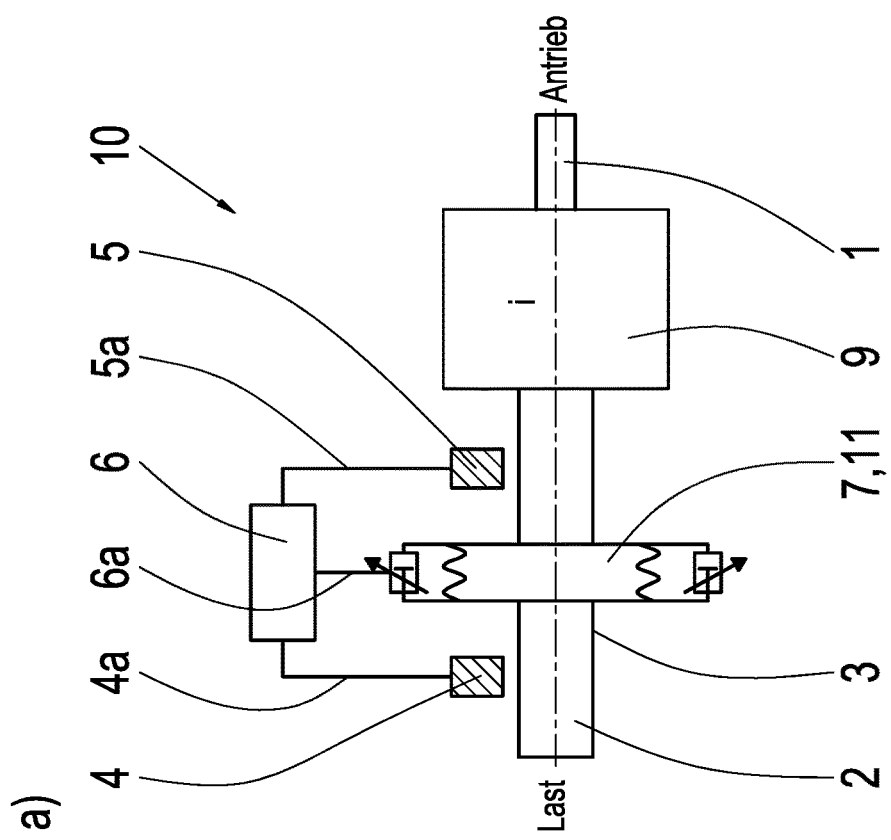
FIG. 2 shows a section of a drive train in a second embodiment.

FIG. 2 shows an axial positioning of the damping element 7 between the first sensor element 4 and the second sensor element 5 in another embodiment, such that the measurement of the torque takes place both in front of the adjustable damping element 7, i.e. by means of the second sensor 5, as well as behind the adjustable damping element 7, i.e. by means of the first sensor 4. The sensor 4 is accordingly located at the load end, while the sensor 5 is located at the drive end. The measurement signal obtained in front of the damping element 7 is sent to the computer 6 via the radio signal transmission path 5a, and the measurement signal obtained behind the damping element 7 is sent to the computer 6 via the radio signal transmission path 4a. The sensors 4, 5 are in the form of magnetoelastic sensors in this embodiment. Rotational rate sensors for detecting a difference in angular positions could also be used. In this case, i.e. when the adjustable damping element is located in the measurement path, the damping characteristic map for all damping amounts that can be set is stored in the computer, in addition to the stiffness, in order to take into account the extent of the damping applied to the active torque, based on the difference in angular speeds. The torque transferred via the clutch 11 can then be derived from the stiffness and the difference in angular positions, the damping and the difference in angular speeds, and from the inertia and the difference in angular accelerations. The mathematical formula for this is:

$$M(t) = \Theta \cdot \ddot{\varphi} + d\_var \cdot \dot{\varphi} + c\_var \cdot \varphi$$

where:

mass inertia is $\Theta$, the adjustable degree of damping is d_var, stiffness is c (or c_var), torque is M, rotational rate is $\omega(t) = \dot{\varphi}$, angular position is $\varphi$, and angular acceleration is $\ddot{\varphi} = \dot{\omega}$.

The aim of this regulation is to reduce d_var(corresponding to d_var) to a minimum in the expression $$QMW[M(t) - QMW(M(t)]$$

wherein QMW is the quadratic mean.

Figure 3:
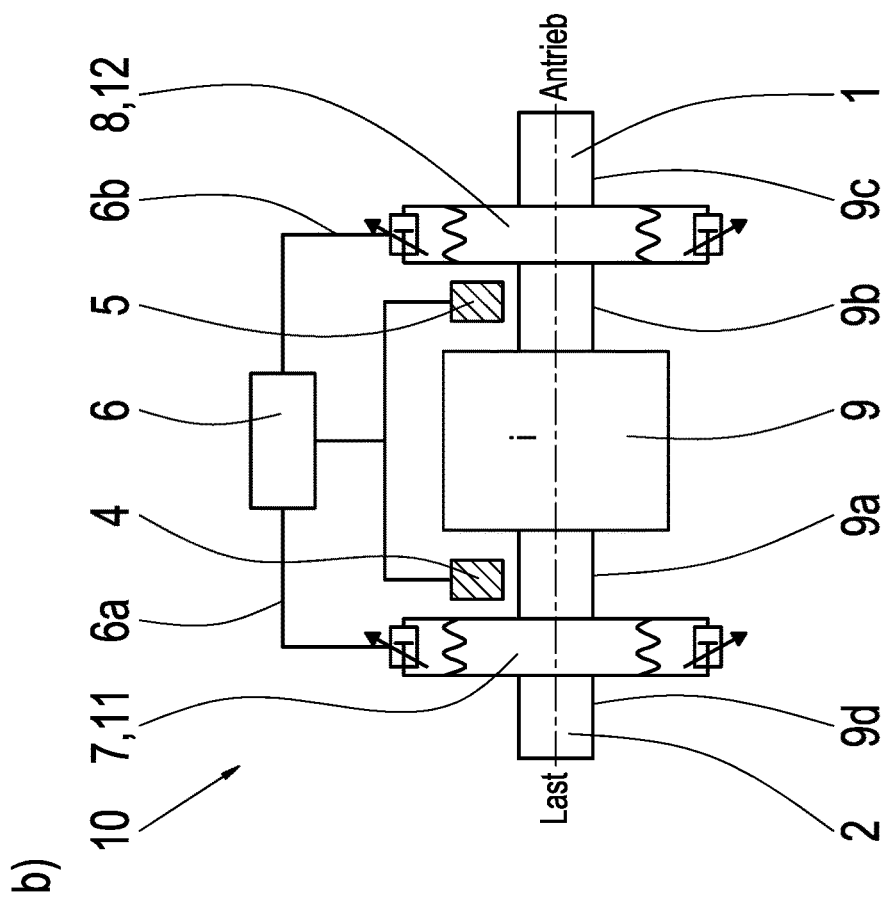
FIG. 3 shows a section of a drive train in a third embodiment.

Another embodiment is shown in FIG. 3, in which the drive train 10 is shown, comprising a transmission 9 with two sensors 4, 5, and two damping elements connected in series, specifically the first damping element 7 and a second damping element 8. "Connected in series," means that the damping elements are arranged successively in relation to the power flow. The second damping element 8 is particularly advantageous when the transmission 9, which has a gear ratio i, is the component that is measured with regard to its torsional stiffness, such that one damping element, the first damping element 7 in this case, is configured to detect the output rotational rate of the output shaft 9a in the transmission, and the other damping element, in this case the second damping element 8, is configured to detect the input rotational rate of the input shaft 9b in the transmission. This use of two rotational rate sensors is particularly ideal for measuring torque. According to the exemplary embodiment in FIG. 3, the first sensor detects the rotational rate of the output shaft.

The damping elements 7, 8 are again configured as clutch elements 11 with adjustable damping in this exemplary embodiment, wherein the clutch element 11 connects the output shaft 9a to a shaft section 9d, which leads to the load end 2, and the clutch element 12 connects the input shaft 9b to a shaft section 9c, which leads to the drive end 1 of the drive train.

Starting from the drive end 1, the components are arranged in the following axial series: second damping element 8, second sensor 5, transmission 9, first sensor 4, first damping element 7, and load end 2.

The measurement values obtained by means of the sensors 4, 5 are sent to the computer unit 6 via radio signal transmission paths 4a, 5a. This evaluates the measurement values and controls the first damping element via a first radio signal transmission path 6a and the second damping element via a second radio signal transmission path 6b in order to dampen and alter the torsional stiffness. As such, both damping elements can be actuated simultaneously. It may also be the case that only one of the two damping elements is actuated, if this is more advantageous according to the control algorithm. Hardwire transmission paths can also be used instead of the radio signal transmission paths in this embodiment.

Figure 5:
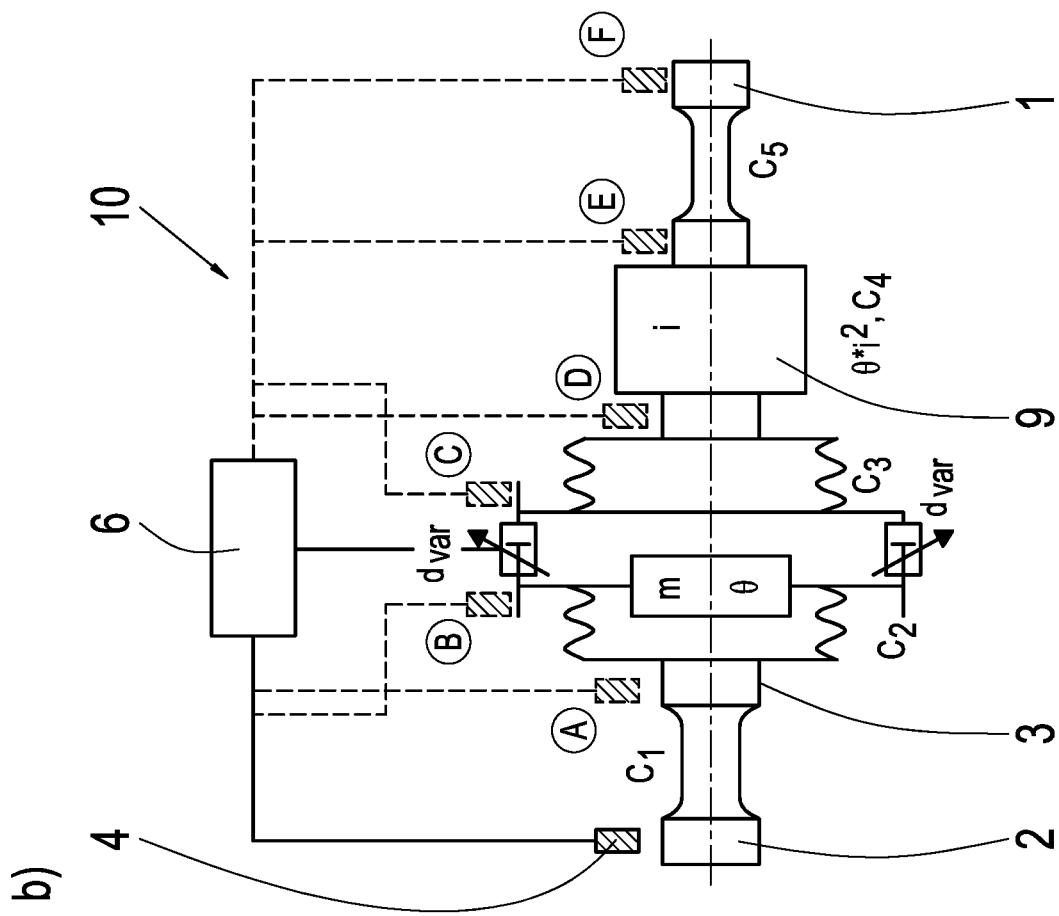
FIG. 5 shows a section of a drive train in an embodiment, with one sensor element.
Figure 4:
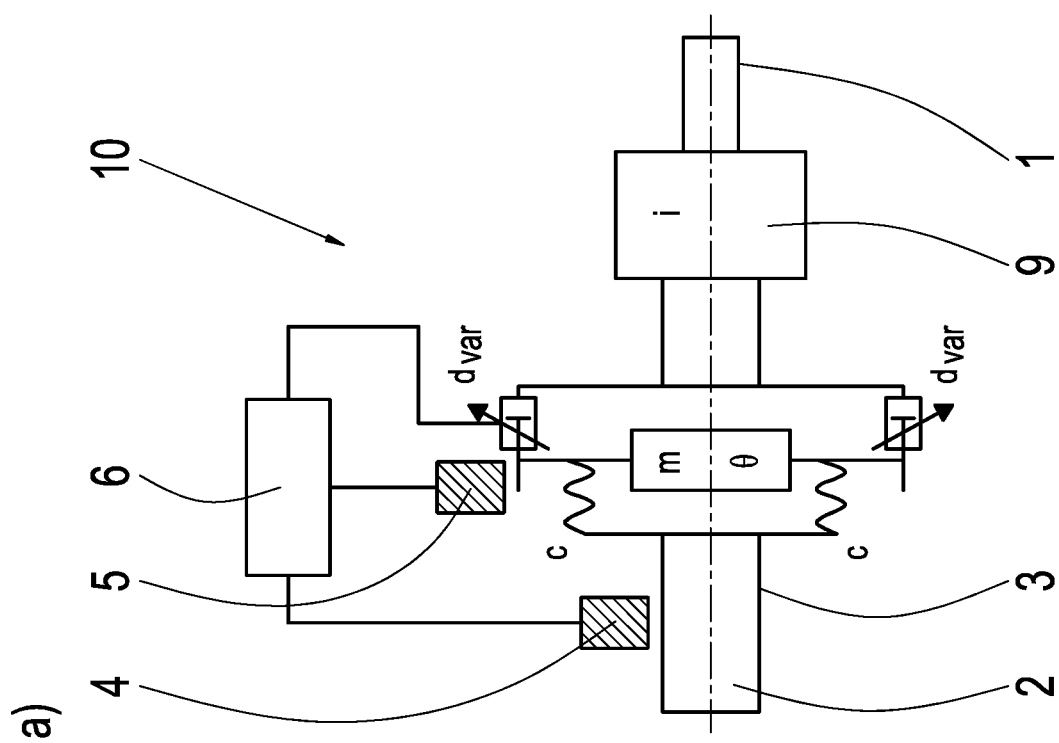
FIG. 4 shows a section of a drive train in an embodiment, with two sensor elements.

FIGS. 4 and 5 show sections of a drive train, as described above, in which the clutch unit is disengaged.

It has be shown that the measurement point(s) for the functional mechanical elements in the drive train, specifically inertias: mass m, moment of inertia $\Theta$;

stiffnesses: c; and damping: d, also including the components of the clutch element, can "cut free" or disengage at arbitrary points. The sequence of the functional elements (damping, stiffness, inertia) can be varied in the drive train, or distributed, e.g. in the form of a series connection (cf. FIG. 3), or in the form of a parallel connection (not shown). With a parallel connection, numerous elements can be located in the clutch unit, or the torque can be distributed, e.g., to different parallel conductor paths.

With angular position sensors or rotational rate sensors, it is assumed there are two measuring points, in order to obtain a difference. FIG. 4a shows two measuring points for a disengaged clutch unit. FIG. 5 shows a first measuring point, and optional, alternative, or additional measuring points A, B, C, D, E, F.

There are numerous ways to obtain the difference in angular positions, which measure the distance at a tangent to, or along the elastic element.

Figure 7:
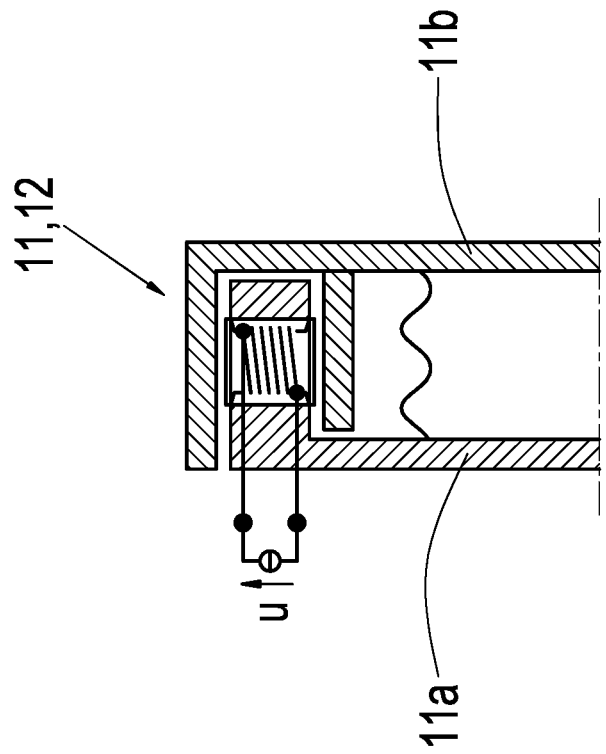
FIGS. 6 to 8 show various embodiments of an adjustable damping element.
Figure 6:
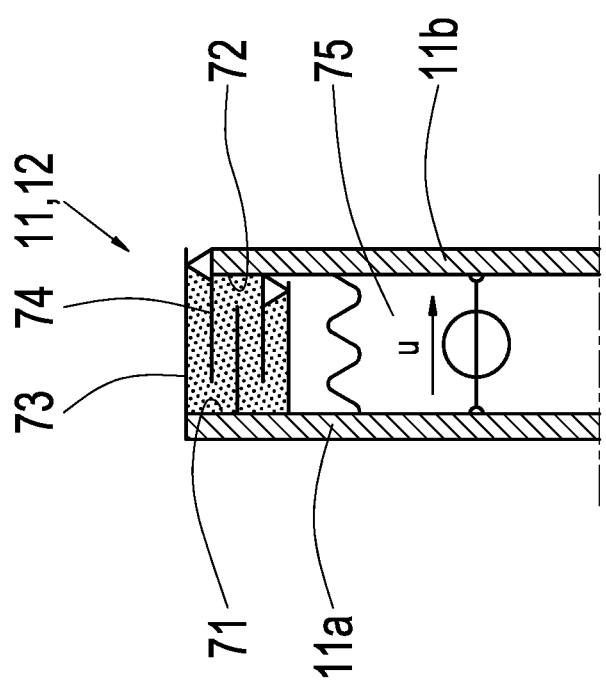
Figure 8:
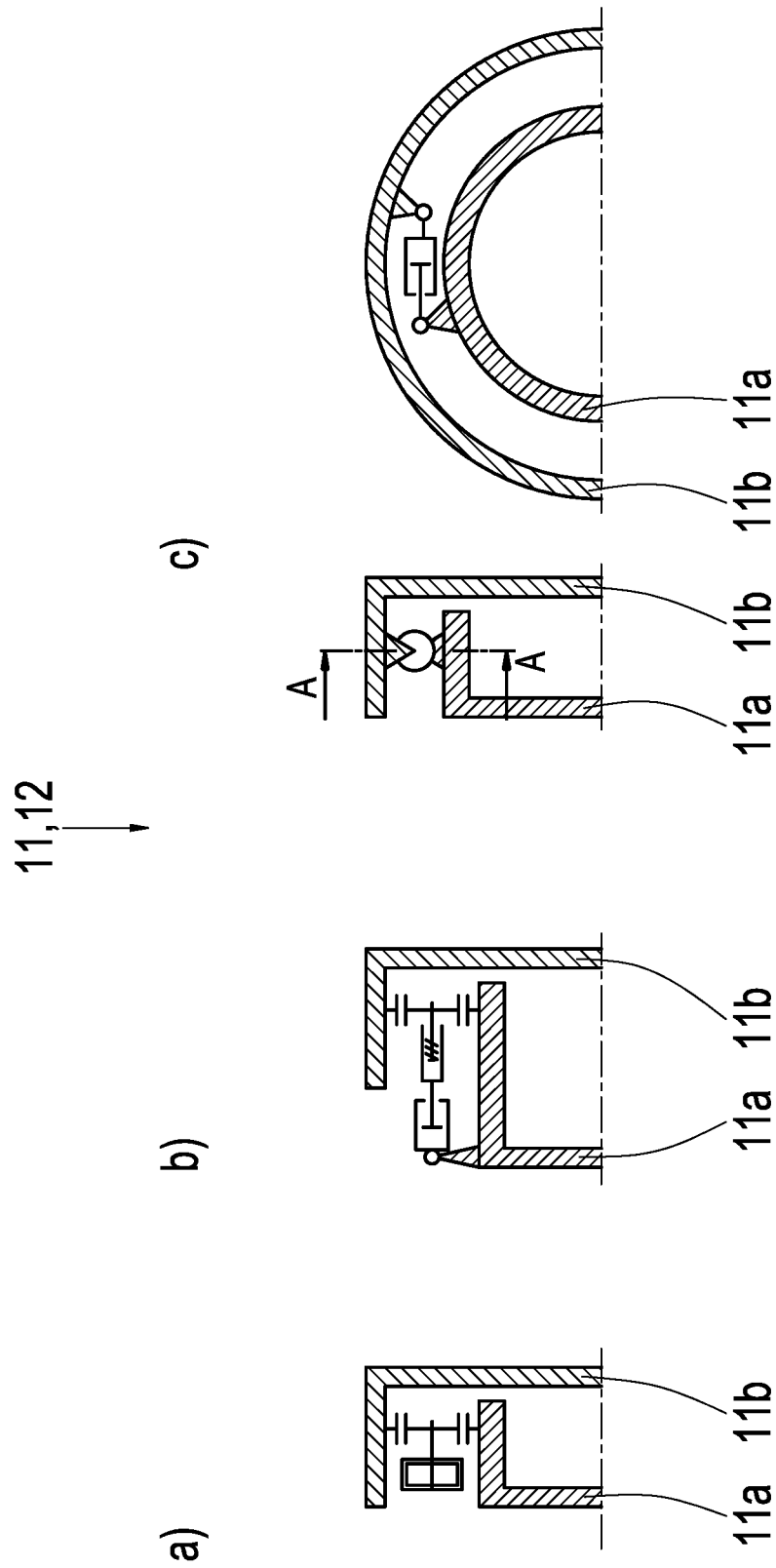

FIGS. 6 to 8 show different damping elements for use in the drive train. A frequency assessment of the torque signal (FFT over a short time interval) is used to actuate the adjustable damping elements, to be able to identify the type of stimulation, i.e. load-side, (e.g. through a propeller or airscrew), or drive-side (e.g. rotational asymmetry in the internal combustion engine), and to dampen at the right point.

The adjustment of the damping in the damping element takes place through ERF, MRF, or by flowing through a choke through hydraulic valves in the case of a shearing of a hydraulic medium.

In FIG. 6, the clutch unit 11 has two flanges 11a and 11b. Both flanges 11a, 11b have surfaces 71, 72 facing one another. Thin cylindrical ribs are provided on the sides 71, 72 of the flanges 11a, 11b, which intermesh in a meandering pattern without coming in contact with the opposite flange.

The ribs form a space 75, closed radially inward and outward, over an insulating seal, which is filled with an electrorheological fluid (ERF). The cylindrical ribs form a capacitor in which the ERF acts as a dielectric medium. When a voltage U is applied, an electrical field is formed, by means of which the particles in the ERF align and alter the shear rate. The change to the shear rate in the viscous ERF results in an adjustable damping in the clutch element.

An adjustable eddy current brake is shown in FIG. 7. The coil generates a magnetic field based on the current source, and this results in a damping torque, based on the field strength and the rotational speed.

Furthermore, a hydraulic piston with two working chambers can be formed between the two shafts or shaft sections, or on the flange on the clutch unit. When the clutch unit is twisted, the fluid is conveyed through a choke from one working chamber to the other. The damping is altered through an adjustable valve or a magnetorheological fluid (MRF), on which a magnetic field acts.

FIG. 8 shows possible embodiments for integrating a hydraulic damper in an elastic clutch unit. The working chambers in the damper are large enough to cover the angular range of the elastic clutch unit.

A known planetary gearing composed of dual-weighted flywheels is illustrated in images a) and b) in FIG. 8, which uses the planet gears for actuating the damper (rotational damper or linear damper). Image c) shows a tangential linear piston damper.

Figure 9:
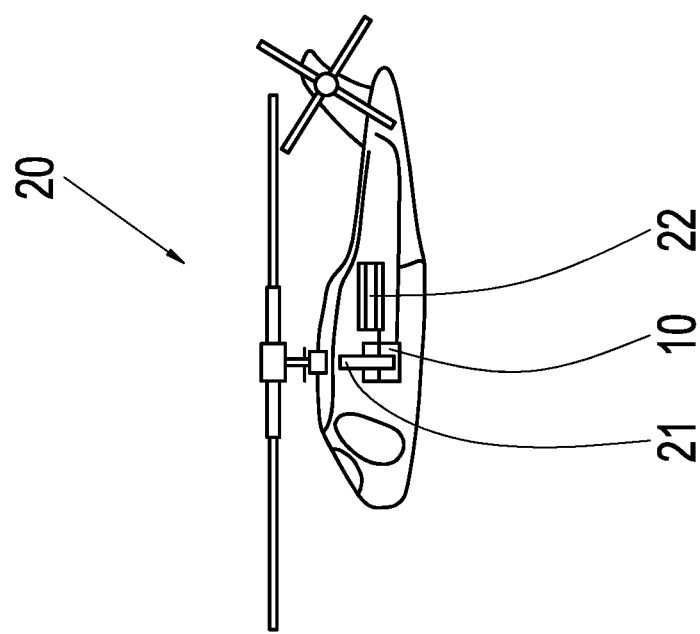
FIG. 9 shows a helicopter that has a drive train.

FIG. 9 shows the use of the drive train 10, powered by a shaft turbine 22 for driving a rotor 21 in a helicopter 20.

Figure 10:
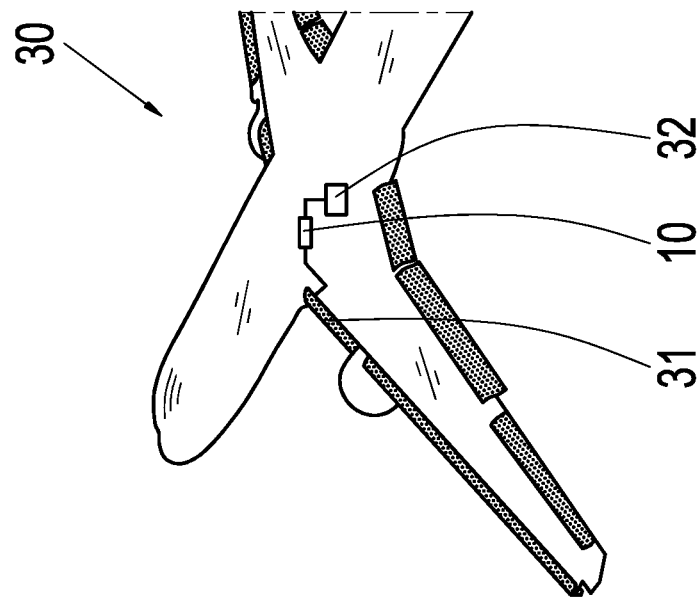
FIG. 10 shows an airplane that has a drive train.

FIG. 10 shows the use of the drive train 10 according to the invention powered by a hydraulic motor 32 for a leading edge flap 31 in an airplane.

Reference Symbols
1 drive end
2 load end
3 shaft, flexible
3a, b shaft section
4 first sensor, sensor element
4a transmission path, radio signal transmission path, hardwire transmission path
5 second sensor, sensor element
5a transmission path, radio signal transmission path, hardwire transmission path
6 computer, control unit, ECU
6a transmission path, radio signal transmission path, hardwire transmission path
6b transmission path, radio signal transmission path, hardwire transmission path
7 first damping element
8 second damping element
9 transmission
9a output shaft
9b input shaft
9c shaft section
9d shaft section
10 drive train
11 first clutch unit, clutch element
12 second clutch unit, clutch element
20 helicopter
21 rotor
22 shaft turbine
30 airplane
31 leading edge flap
32 hydraulic motor
c/c_var stiffness [N*mm*mm]
d/d_var damping [kg/s], adjustable degree of damping
m mass [kg]
$\Theta$ moment of inertia [kg*m*m], mass inertia
$\varphi$ angular position [°]
$w(t)=\dot{\varphi}$ rotational rate [°/s]
$\ddot{\varphi}=\omega$ angular acceleration [°/s2]

We claim:

1. A method for damping torsional vibrations in a drive train of an aircraft, the method comprising:
    determining a torsional moment acting on a torque-conducting component of the drive train using at least one sensor integrated in a drive train component;
    adjusting at least one adjustable damping element located in or on the torque-conducting component of the drive train based on the torsional moment; and
    regulating a torsional stiffness of the torque-conducting component to reduce the torsional load in the component.

2. The method according to claim 1, wherein the torsional moment is determined using at least one of:
    a magnetoelastic or magnetoresistant sensor;
    an angular position sensor; and
    an acoustic sensor.

3. The method according to claim 1, wherein the torsional moment is determined using a first and second sensor element.

4. The method according to claim 1, wherein the sensor element is located on at least one of a transmission, a shaft, and a bearing.

5. The method according to claim 1, wherein the determined torsional moment is used for adjusting two adjustable damping elements to reduce the torsional load in the component.

6. A drive train in an aircraft, comprising:
    a component that is configured to conduct a torque in the drive train,
    wherein the component includes at least one sensor element integrated in the component, the at least one sensor element being configured to determine a torsional moment acting on the component,
    wherein the component includes at least one adjustable damping element the at least one adjustable damping element being configured to reduce a torsional load in the component to adjust the degree of damping in the component, and
    wherein the component includes a control and regulating unit, the control and regulating unit being configured to evaluate the determined torsional moment, and to control the adjustable damping element based on the evaluated torsional moment.

7. The drive train according to claim 6, wherein the damping element is integrated in a clutch unit, and wherein the clutch unit connects two sections of the component to one another.

8. The drive train according to claim 6, wherein two sensor elements are included for determining the torsional moment.

9. The drive train according to claim 6, wherein two damping elements, connected either in series or parallel, are included for reducing the torsional load.

10. The drive train according to claim 6, wherein the aircraft is a helicopter.

11. The drive train according to claim 6, wherein the aircraft is an airplane.

12. A torque-conducting component for use in a drive train of an aircraft, comprising:
   at least one sensor integrated in the torque-conducting component and configured to determine a torsional moment acting on the torque-conducting component;
   an adjustable damping element configured to reduce a torsional load in the component to adjust the degree of damping in the component; and
   a control and regulating unit, the control and regulating unit being configured to evaluate the determined torsional moment, and to control the adjustable damping element based on the evaluated torsional moment.

13. The torque-conducting component of claim 12, wherein the damping element is integrated in a clutch unit, and wherein the clutch unit connects two sections of the torque-conducting component to one another.

14. The torque-conducting component of claim 12, wherein two sensor elements are included for determining the torsional moment.

15. The torque-conducting component of claim 12, wherein two damping elements, connected either in series or parallel, are included for reducing the torsional load.

16. The torque-conducting component of claim 12, wherein the torque-conducting unit is included in a helicopter.

17. The torque-conducting component of claim 12, wherein the torque-conducting unit is included in an airplane.

* * * * *